United States Patent
Ham et al.

(10) Patent No.: US 10,352,758 B2
(45) Date of Patent: Jul. 16, 2019

(54) APPARATUS FOR ESTIMATING VEHICLE MASS USING TIRE AIR PRESSURE AND METHOD THEREOF

(71) Applicant: HYUNDAI AUTRON CO., LTD., Seongnam-si (KR)

(72) Inventors: Seung-Geun Ham, Seongnam-si (KR); Seung-Hwan Shin, Gwangmyeong-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 228 days.

(21) Appl. No.: 14/951,607

(22) Filed: Nov. 25, 2015

(65) Prior Publication Data

US 2016/0153827 A1 Jun. 2, 2016

(30) Foreign Application Priority Data

Nov. 27, 2014 (KR) .................... 10-2014-0167347

(51) Int. Cl.
*G01G 5/00* (2006.01)
*G01G 19/08* (2006.01)

(52) U.S. Cl.
CPC ............ *G01G 19/08* (2013.01); *G01G 5/006* (2013.01)

(58) Field of Classification Search
CPC .................................................... G01G 19/08
See application file for complete search history.

(56) References Cited

U.S. PATENT DOCUMENTS

2012/0245787 A1* 9/2012 Kawasaki ............ B60C 23/062
                                                              701/29.1
2014/0114558 A1    4/2014 Singh et al.

FOREIGN PATENT DOCUMENTS

JP    2010-167865 A    8/2010
JP    2012-202836 A    10/2012

OTHER PUBLICATIONS

Korean Intellectual Property Office, Office Action for Korean patent application No. 10-2014-0167347, dated Mar. 30, 2016, Korea.

* cited by examiner

*Primary Examiner* — Manuel A Rivera Vargas
(74) *Attorney, Agent, or Firm* — Baker & Hostetler LLP; Hyunho Park (57) ABSTRACT

Provided are an apparatus for estimating vehicle mass using tire air pressure and a method thereof, the apparatus for estimating the vehicle mass including: an air pressure determining unit; a speed measuring unit; a data storing unit; an error calculating unit; and a mass calculating unit.

13 Claims, 4 Drawing Sheets

FIG. 4

APPARATUS FOR ESTIMATING VEHICLE MASS USING TIRE AIR PRESSURE AND METHOD THEREOF

CROSS-REFERENCE TO RELATED APPLICATIONS

This application claims priority to and the benefit of Korean Patent Application No. 10-2014-0167347 filed in the Korean Intellectual Property Office on Nov. 27, 2014, the entire contents of which are incorporated herein by reference.

TECHNICAL FIELD

The present invention relates to an apparatus for estimating vehicle mass using tire air pressure and a method thereof, and more particularly, to an apparatus for estimating vehicle mass using tire air pressure and wheel speed of the vehicle and a method thereof.

BACKGROUND ART

Recently, in a vehicle, a tire pressure monitoring system (TPMS) which detects an air-pressure drop of a tire installed in the vehicle to notify the detected air-pressure drop to a driver has been installed.

When the air pressure of the tire is decreased, the vehicle easily slides and thus a major accident may be caused, a fuel consumption amount is increased, and thus, fuel efficiency deteriorates. Further, when the air pressure of the tire is decreased, a lifespan of the tire is decreased and riding quality and braking power are largely decreased.

The TPMS notifies the pressure drop of the tire to the driver by checking a pressure state of the tire to prevent the problems from being generated.

The TPMS may be largely divided into a direct type and an indirect type.

The direct type is to directly measure air pressure of the tire by installing a pressure sensor inside a tire wheel. The direct type may detect the reduction of the air pressure of the tire with high accuracy, but has disadvantages in terms of a technique and cost in that a dedicated wheel is required and there is a problem in performance in an actual environment.

The indirect type is a method for estimating tire air pressure from rotation information of the tire. The indirect type TPMS may be particularly classified into a dynamic loaded radius (DLR) analysis type and a resonance frequency method (RFM) analysis type again. The types are briefly abbreviated as the radius analysis and the frequency analysis.

The frequency analysis type is a type of detecting a difference between a decompressed tire and a normal pressure tire by using a change in frequency characteristic of a rotation speed signal of the wheel. In the frequency analysis type, when the corresponding resonance frequency is calculated to be relatively lower than a reference frequency estimated during initialization by paying attention to the resonance frequency which may be calculated by frequency analysis of the wheel rotation speed signal, it is determined that the tire is decompressed.

The radius analysis type is a type for detecting pressure drop by comparing rotation speeds of four tires by using a phenomenon in which the decompressed tire has a small dynamic loaded radius while driving and as a result, rotates faster than the normal tire.

Meanwhile, the vehicle mass is very important information in various chassis control systems. For example, in various chassis control systems, a tire pressure monitoring system (TPMS), an electronic stability controller (ESC), active roll stabilization (ARS) device, a continuous damping controller (CDC), and the like may be included. When variation of the mass of the vehicle occurs, a slip of the tire occurs and thus, an engine RPM may vary. Further, in the period, a transmission shock is generated and thus, riding quality may be decreased.

The vehicle mass is modeled by a spring, a damper, and a vehicle weight to be estimated by applying an equation of motion of moving and vibrating by external force and internal driving force to the vehicle.

As another method, in a method for measuring vehicle body mass to be installed in the vehicle, an expensive garage sensor is additionally installed in the vehicle to estimate the mass of the vehicle.

However, in the method for measuring the vehicle mass, the vehicle mass is not accurately estimated. Further, a garage sensor for measuring the vehicle mass needs to be additionally installed, and inaccurate estimation of the vehicle mass influences control performance.

SUMMARY OF THE INVENTION

The present invention has been made in an effort to provide an apparatus for estimating vehicle mass using tire air pressure and a method thereof capable of easily estimating the vehicle mass by estimating the vehicle mass from tire air pressure and wheel speeds of the vehicle by using a wheel speed difference map for each vehicle tire characteristic and a mass map for each vehicle speed.

The present invention has also been made in an effort to provide an apparatus for estimating vehicle mass using tire air pressure and a method thereof capable of accurately estimating the vehicle mass using a sensor pre-installed in the vehicle without an additional garage sensor or a sensor for estimating or measuring the vehicle mass by acquiring tire air pressure of each wheel through an air pressure sensor of each wheel installed in the vehicle and acquiring a wheel speed through a wheel speed sensor installed in each wheel.

The present invention has also been made in an effort to provide an apparatus for estimating vehicle mass using tire air pressure and a method thereof capable of improving performance of each system by providing the estimated vehicle mass to various chassis control systems (for example, iTPMS, ESC, ARS, CDC, and the like) of the vehicle.

An exemplary embodiment of the present invention provides an apparatus for estimating vehicle mass using tire air pressure including: an air pressure determining unit configured to acquire a vehicle speed and tire air pressure of front wheels and rear wheels of a vehicle and determine whether the acquired tire air pressure is included in a predetermined air pressure range; a speed measuring unit configured to measure wheel speeds of the front wheels and the rear wheels of the vehicle when the tire air pressure is in the predetermined air pressure range, respectively; a data storing unit configured to store a predetermined air pressure range, a wheel speed difference map for each vehicle tire characteristic, and a mass map for each vehicle speed; an error calculating unit configured to calculate a wheel speed difference of the front wheel and the rear wheel measured in the speed measuring unit and calculate an error by comparing the calculated wheel speed difference of the front wheel and the rear wheel with a wheel speed difference according to a wheel speed difference map for each vehicle tire characteristic pre-stored in the data storing unit; and a mass calculating unit configured to calculate vehicle mass corresponding to the error between the calculated wheel speed differences by using a mass map for each vehicle speed pre-stored in the data storing unit.

The air pressure determining unit may determine that the acquired tire air pressure is included in the predetermined air pressure range when the acquired air pressure belongs to the predetermined air pressure range and a difference between a maximum and a minimum of the acquired air pressure is within the predetermined air pressure.

The error calculating unit may calculate average speeds of the front wheels and the rear wheels, respectively, and calculate a difference between the calculated average speeds of the front wheels and the rear wheels.

The error calculating unit may calculate a wheel speed difference between the front wheel and the rear wheel of the vehicle corresponding to the acquired vehicle speed by using a wheel speed difference map for each vehicle tire pre-stored in the data storing unit and calculate an error by comparing the calculated wheel speed difference of the front wheel and the rear wheel with the wheel speed difference between the front wheel and the rear wheel of the vehicle calculated by using the wheel speed difference map for each vehicle tire.

The data storing unit may store the wheel speed difference map for each vehicle speed in which the vehicle speed according to a vehicle tire characteristic and the wheel speed difference between the front wheel and the rear wheel of the vehicle are mapped.

The data storing unit may store a mass map for each vehicle speed in which the error between the wheel speed differences according to the vehicle speed and the vehicle mass are mapped.

The vehicle tire characteristic may be a tire characteristic in which one or more characteristics of a tire type, a tire size, a tire mass, a tire use, and tire manufacturing information are combined.

Another exemplary embodiment of the present invention provides a method for estimating vehicle mass using tire air pressure including: acquiring a vehicle speed and tire air pressure of front wheels and rear wheels of a vehicle; determining whether the acquired tire air pressure is included in a predetermined air pressure range; measuring wheel speeds of the front wheels and the rear wheels of the vehicle when the tire air pressure is in the predetermined air pressure range, respectively; calculating the measured wheel speed difference between the front wheel and the rear wheel; calculating an error by comparing the calculated wheel speed difference of the front wheel and the rear wheel with a wheel speed difference according to a pre-stored wheel speed difference map for each vehicle tire characteristic; and calculating vehicle mass corresponding to the error between the calculated wheel speed differences by using a pre-stored mass map for each vehicle speed.

In the determining of whether the acquired tire air pressure is in the predetermined normal air pressure range, it may be determined that the acquired tire air pressure is included in the predetermined air pressure range when the acquired air pressure belongs to the predetermined air pressure range and a difference between a maximum and a minimum of the acquired air pressure is within the predetermined air pressure.

In the calculating of the wheel speed difference, average speeds of the front wheels and the rear wheels may be calculated, respectively, and a difference between the calculated average speeds of the front wheels and the rear wheels may be calculated.

The calculating of the error may include: calculating a wheel speed difference between the front wheel and the rear wheel of the vehicle corresponding to the acquired vehicle speed by using the pre-stored wheel speed difference map for each vehicle tire; and calculating an error by comparing the calculated wheel speed difference of the front wheel and the rear wheel with the wheel speed difference between the front wheel and the rear wheel of the vehicle calculated by using the wheel speed difference map for each vehicle tire.

In the pre-stored wheel speed difference map for each vehicle speed, the vehicle speed according to a vehicle tire characteristic and the wheel speed difference between the front wheel and the rear wheel of the vehicle may be mapped.

In the pre-stored mass map for each vehicle speed, the error between the wheel speed differences according to the vehicle speed and the vehicle mass may be mapped.

According to the exemplary embodiments of the present invention, it is possible to easily estimate the vehicle mass by estimating the vehicle mass from tire air pressure and wheel speeds of the vehicle by using a wheel speed difference map for each vehicle tire characteristic and a mass map for each vehicle speed.

It is also possible to accurately estimate the vehicle mass using a sensor pre-installed in the vehicle without an additional garage sensor or a sensor for estimating or measuring the vehicle mass by acquiring tire air pressure of each wheel through an air pressure sensor of each wheel installed in the vehicle and acquiring a wheel speed through a wheel speed sensor installed in each wheel.

It is also possible to improve performance of each system controlling a chassis using the vehicle mass by estimating the vehicle mass in real time to provide the estimated vehicle mass to various chassis control systems (for example, iTPMS, ESC, ARS, CDC, and the like) of the vehicle while driving.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

In describing the exemplary embodiment, technological contents which are well known in the art included in the specification and are not associated with the specification will not be described. This is to more clearly transfer the spirit of the specification without making the spirit of the specification be ambiguous by omitting unnecessary description.

Due to the same reason, some components are enlarged, omitted, or schematically illustrated. Further, an actual size is not completely reflected on the size of each component. In each drawing, the same reference numeral refers to the same or corresponding component.

Figure 1:
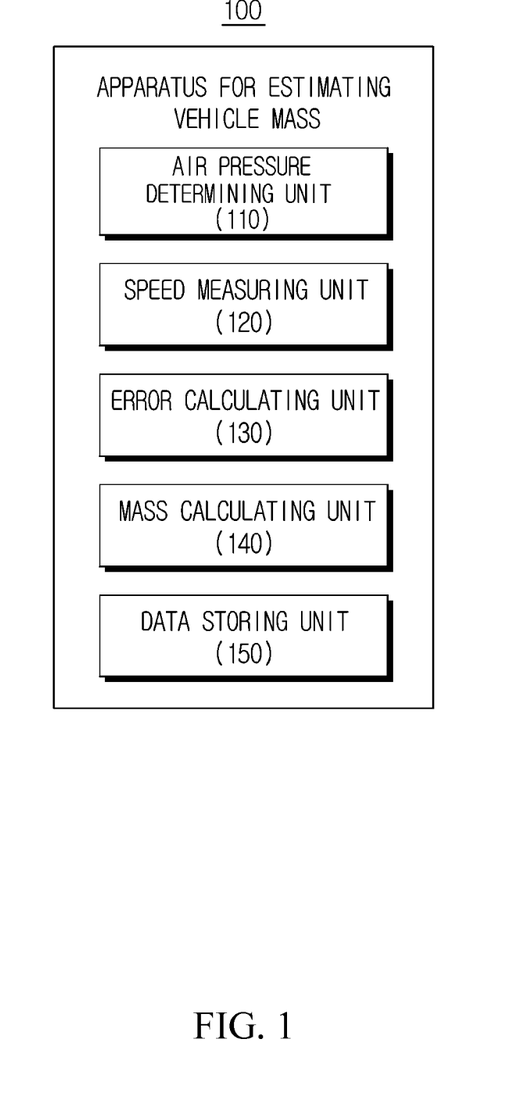
FIG. 1 is a block diagram of an apparatus for estimating vehicle mass using tire air pressure according to an embodiment of the present invention.

FIG. 1 is a block diagram of an apparatus for estimating vehicle mass using tire air pressure according to an exemplary embodiment of the present invention.

As illustrated in FIG. 1, an apparatus 100 for estimating vehicle mass using tire air pressure according to the exemplary embodiment of the present invention includes an air pressure determining unit 110, a speed measuring unit 120, an error calculating unit 130, a mass calculating unit 140, and a data storing unit 150.

Hereinafter, detailed configurations and operations of constituent elements of the apparatus 100 for estimating vehicle mass using tire air pressure of FIG. 1 will be described.

The air pressure determining unit 110 acquires vehicle speed and tire air pressure of a front wheel and a rear wheel of the vehicle. For example, the air pressure determining unit 110 may acquire air pressure of a front right (FR) wheel and a front left (FL) wheel of the vehicle and a rear right (RR) wheel and a rear left (RL) wheel of the vehicle. Alternatively, the air pressure determining unit 110 may sense air pressure of each wheel through an air pressure sensor installed in each wheel.

The air pressure determining unit 110 determines whether the acquired tire air pressure is included in a predetermined air pressure range.

Herein, the predetermined air pressure range is an air pressure normal range pre-measured based on a normal tire. The air pressure determining unit 110 may verify a difference between maximum air pressure and minimum air pressure in addition to the acquired air pressure to determine whether the difference is included in the predetermined normal air pressure range. That is, the air pressure determining unit 110 may verify whether the air pressure is within the normal range and a result acquired by subtracting a minimum air pressure value from a maximum air pressure value is within a predetermined value. Subsequently, the air pressure determining unit 110 may determine that the tire air pressure is included in the predetermined air pressure range when the acquired tire air pressure belongs to the predetermined normal air pressure range and the difference between the maximum and the minimum of the acquired air pressure is within the predetermined air pressure.

As the result determined in the air pressure determining unit 110, when the tire air pressure is in the predetermined air pressure range, the speed measuring unit 120 measures wheel speeds of the front wheel and the rear wheel of the vehicle, respectively. Alternatively, the speed measuring unit 120 may acquire wheel speeds of the FR and the FL of the vehicle and wheel speeds of the RR and the RL of the vehicle through a wheel speed sensor installed in the front wheel and the rear wheel of the vehicle. Herein, the wheel speed sensor measures a rotation speed of each wheel of the vehicle. In a four-wheel vehicle, a total of four wheels are provided and four wheel speed sensors for measuring the rotation speed of each wheel may be installed. The wheel speed sensor may transfer information on the measured rotation speed of each wheel to the air pressure determining unit 110.

The error calculating unit 130 calculates a difference in wheel speed between the front wheel and the rear wheel measured in the speed measuring unit 120. In this case, the wheel speed may be an average speed of the wheel speeds which belong to the front wheel and the rear wheel of the vehicle. Then, the error calculating unit 130 may calculate an average speed of front wheels of the vehicle, that is, two front wheels and calculate an average speed of two rear wheels. Subsequently, the error calculating unit 130 calculates a difference between the calculated average speeds of the front wheels and the rear wheels.

The error calculating unit 130 calculates an error by comparing a wheel speed difference according to a wheel speed difference map for each vehicle tire characteristic pre-stored in the data storing unit 150 and the calculated wheel speed difference between the front wheels and the rear wheels.

In detail, the error calculating unit 130 calculates the wheel speed difference between the front wheels and the rear wheels of the vehicle corresponding to the vehicle speed by using the wheel speed difference map for each vehicle tire which is pre-stored in the data storing unit 150. Subsequently, the error calculating unit 130 calculates an error by comparing the wheel speed difference between the front wheels and the rear wheels of the vehicle calculated by using the wheel speed difference map for each vehicle tire and the calculated wheel speed difference between the front wheels and the rear wheels.

The mass calculating unit 140 calculates vehicle mass corresponding to the error between the wheel speed differences calculated in the error calculating unit 130 by using a mass map for each vehicle speed pre-stored in the data storing unit 150.

The data storing unit 150 stores a predetermined air pressure range, a wheel speed difference map for each vehicle tire characteristic, and a mass map for each vehicle speed. That is, the data storing unit 150 stores the wheel speed difference map for each vehicle speed in which the vehicle speed and the wheel speed difference between the front wheels and the rear wheels of the vehicle are mapped according to the vehicle tire characteristic. Further, the data storing unit 150 stores the mass map for each vehicle speed in which the error between the wheel speed differences and the vehicle mass are mapped according to the vehicle speed.

Herein, in the wheel speed difference map for each vehicle tire, the vehicle speed for each vehicle tire characteristic and the wheel speed difference between the front wheels and the rear wheels of the vehicle are pre-calculated and stored. That is, the apparatus 100 for estimating the vehicle mass pre-stores detailed information on the tire characteristic of the vehicle.

Figure 2:
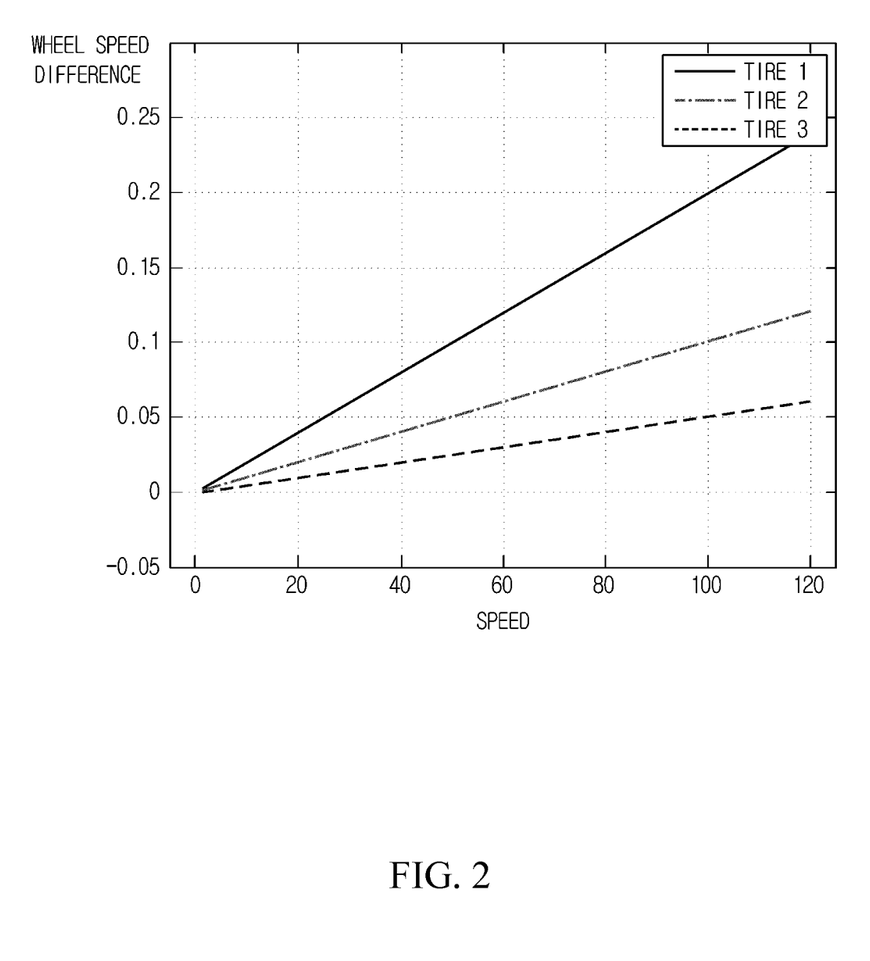
FIG. 2 is an explanatory diagram for a wheel speed difference map for each vehicle tire characteristic according to the exemplary embodiment of the present invention.

FIG. 2 is a description diagram for a wheel speed difference map for each vehicle tire characteristic according to the exemplary embodiment of the present invention.

The wheel speed difference map for each vehicle tire illustrated in FIG. 2 is pre-measured for each vehicle tire characteristic to be pre-stored in the data storing unit 150. Herein, the vehicle tire characteristic may be a tire characteristic in which one or more characteristics of a tire type, a tire size, tire mass, a tire use, and tire manufacturing information are combined. For example, in the tire size, a tire width, a flatness ratio, a tire internal diameter, a load index, and the like may be included. The tire use may include a use for a passenger car, a use for a freight, a use for a four-season, a use for a winter-season, and the like may be included. Further, in the tire manufacturing information, a tire manufacturer, a tire model name, a tire size, a production time, a production factory, and the like may be included.

In the wheel speed difference map for each vehicle tire, the wheel speed difference corresponding to the vehicle speed is proportionally mapped. That is, when the vehicle speed is increased, the wheel speed difference is linearly increased with a constant slope. On the contrary, when the vehicle speed is decreased, the wheel speed difference is linearly decreased with a constant slope.

The wheel speed difference corresponding to the vehicle speed is divided for each tire characteristic.

As an example, a case where the tire characteristic is tire 1, the vehicle speed is 60 km/h, and the wheel speed difference between the front wheels and the rear wheels of the vehicle which is actually measured is 0.11 will be described below.

First, the error calculating unit 130 may calculate the wheel speed difference between the front wheels and the rear wheels of the vehicle corresponding to 60 km/h to 0.12 by using the wheel speed difference map for each vehicle tire illustrated in FIG. 2.

Subsequently, the error calculating unit 130 may calculate an error to 0.01 by comparing the wheel speed difference (0.12) between the front wheels and the rear wheels of the vehicle calculated by using the wheel speed difference map for each vehicle tire and the calculated wheel speed difference (0.11) between the front wheels and the rear wheels, which is actually measured and calculated.

Figure 3:
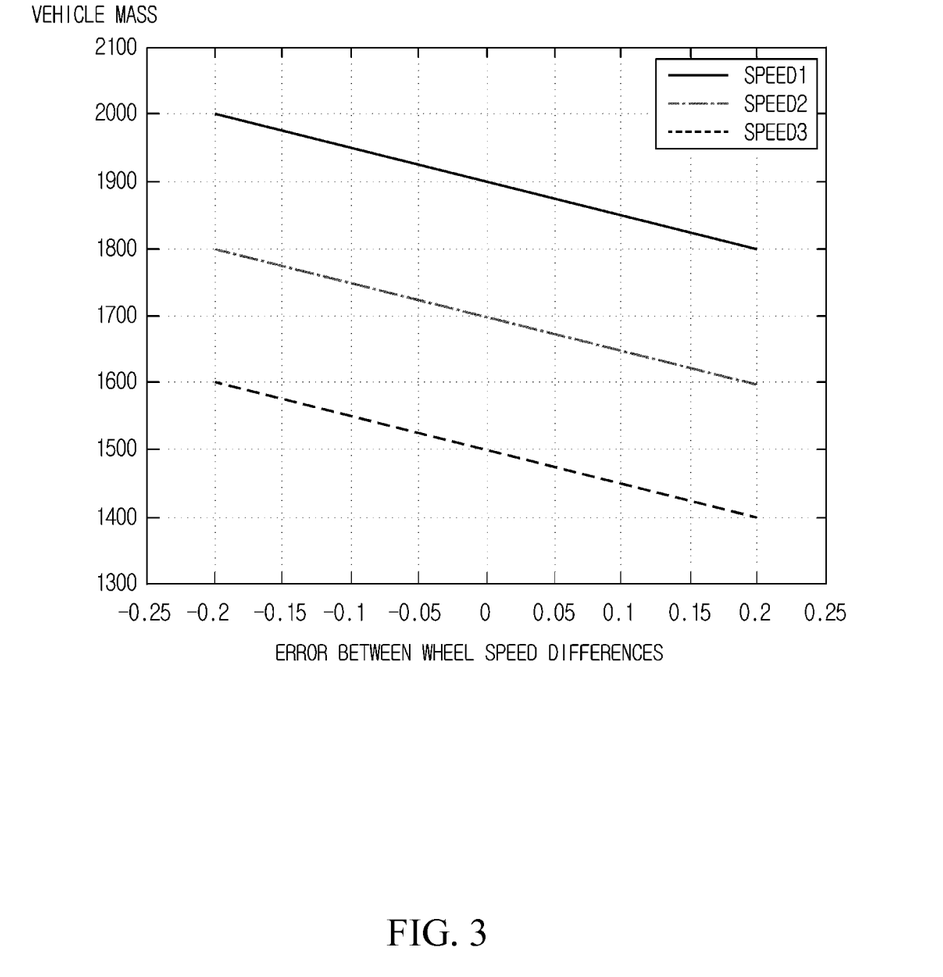
FIG. 3 is an explanatory diagram for a mass map for each vehicle speed according to the exemplary embodiment of the present invention.

FIG. 3 is an explanatory diagram for a mass map for each vehicle speed according to the exemplary embodiment of the present invention.

The mass map for each vehicle speed illustrated in FIG. 3 is pre-measured for each vehicle speed to be pre-stored in the data storing unit 150.

In the mass map for each vehicle speed, the vehicle mass is mapped based on the error between the wheel speed difference according to the wheel speed difference map for each vehicle tire characteristic and the calculated wheel speed difference. That is, when the error between the wheel speed differences is increased, the vehicle mass is linearly decreased with a constant slope. On the contrary, when the error between the wheel speed differences is decreased, the vehicle mass is linearly increased with a constant slope. Further, the vehicle mass is divided for each vehicle speed.

As an example, a case where the vehicle speed is speed 1 (for example, 60 km/h) illustrated in FIG. 3 and the error of the wheel speed difference is 0.1 will be described below.

First, the mass calculating unit 140 verifies that the vehicle speed is speed 1 and the error between the wheel speed differences calculated in the error calculating unit 130 by using the pre-stored mass map for each vehicle speed is 0.1.

In addition, the mass calculating unit 140 may calculate to 1,850 the vehicle mass corresponding to the error (0.1) between the vehicle speed (speed 1) and the wheel speed difference in the mass map for each vehicle speed illustrated in FIG. 3.

Figure 4:
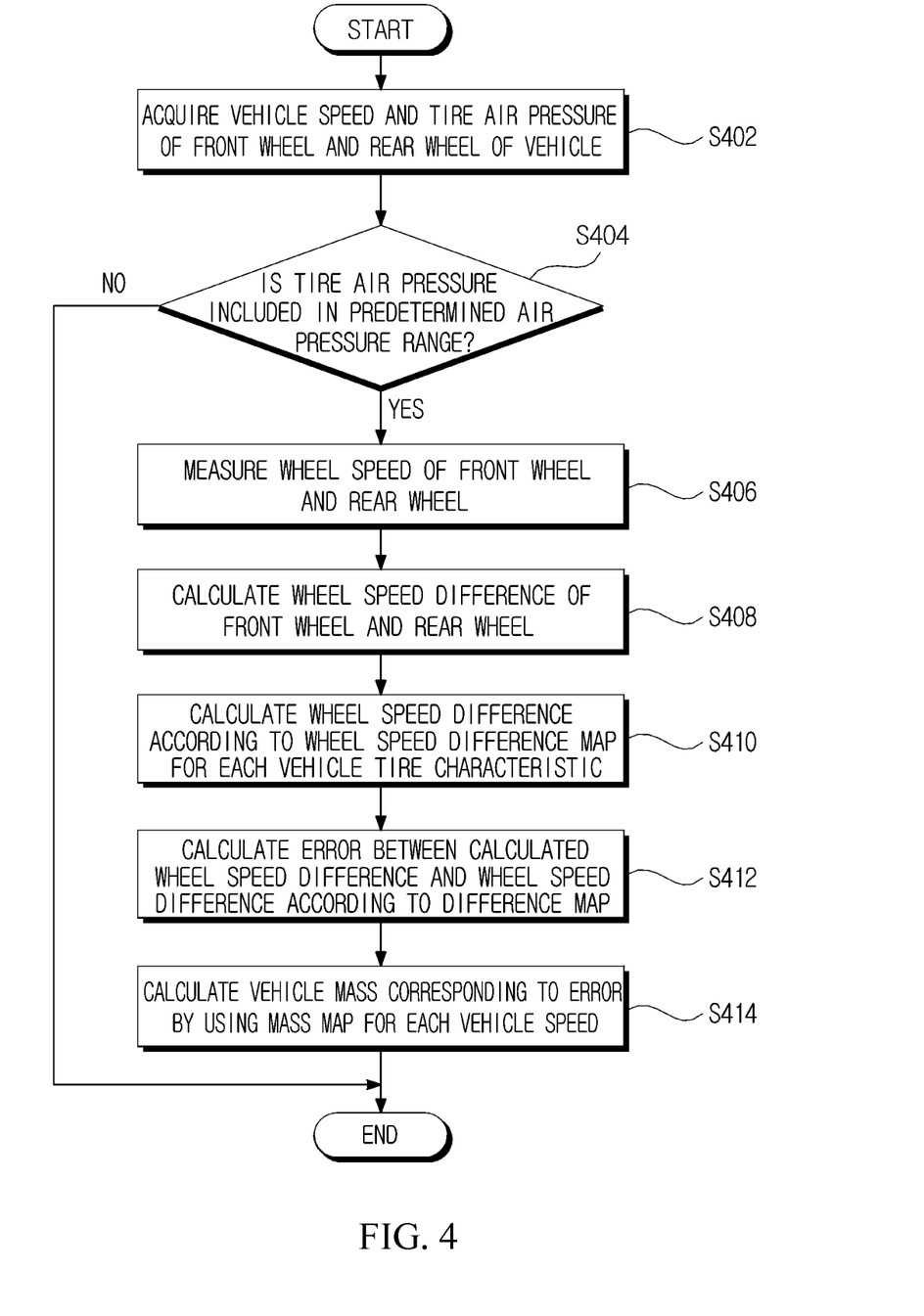
FIG. 4 is a flowchart of a method for estimating vehicle mass using tire air pressure according to another exemplary embodiment of the present invention.

FIG. 4 is a flowchart of a method for estimating vehicle mass using tire air pressure according to another exemplary embodiment of the present invention.

The air pressure determining unit 110 acquires a vehicle speed and tire air pressure of a front wheel and a rear wheel of the vehicle (S402).

The air pressure determining unit 110 determines whether the acquired tire air pressure of the front wheel and the rear wheel of the vehicle is included in a predetermined air pressure range (S404). Herein, the air pressure determining unit 110 may determine that a case where the acquired tire air pressure is included in the predetermined air pressure range and a difference between a maximum and a minimum of the acquired air pressure is within the predetermined air pressure is included in a predetermined air pressure range. Step S404 is to determine whether the method for estimating the vehicle mass according to this specification may be applied.

In the verified result (S404), when the air pressure of the front wheel and the rear wheel of the vehicle is included in the predetermined air pressure range, the speed measuring unit 120 measures wheel speeds of the front wheel and the rear wheel of the vehicle. On the contrary, in the verified result (S404), when the air pressure of the front wheel and the rear wheel of the vehicle is not included in the predetermined air pressure range, the process for estimating the vehicle mass ends.

The error calculating unit 130 calculates a wheel speed difference between the front wheel and the rear wheel of the vehicle (S406). In this case, the error calculating unit 130 may calculate average speeds of the front wheels and the rear wheels of the vehicle, respectively, and calculate a difference between the calculated average speeds of the front wheels and the rear wheels.

Subsequently, the error calculating unit 130 calculates a wheel speed difference according to a wheel speed difference map for each vehicle tire characteristic (S408).

Thereafter, the error calculating unit 130 calculates an error by comparing the wheel speed difference calculated in step S406 and the wheel speed difference according to the difference map calculated in step S408 (S410).

The mass calculating unit 140 calculates the vehicle mass corresponding to the error calculated in step S410 by using the mass map for each speed (S412).

As such, the apparatus 100 for estimating the vehicle mass acquires the tire air pressure of each wheel through the air pressure sensor of each wheel installed in the vehicle and acquires the wheel speed through the wheel speed sensor installed in each wheel to accurately estimate the mass of the vehicle by using the sensors pre-installed in the vehicle without an additional garage sensor or a sensor for measuring the vehicle mass.

The apparatus 100 for estimating the vehicle mass may provide the vehicle mass estimated in real time to various chassis control systems (for example, iTPMS, ESC, ARS, CDC, and the like) of the vehicle.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for estimating vehicle mass in a tire pressure monitoring system (TPMS) of a vehicle, the apparatus comprising:
   an air pressure determining unit, the air pressure determining unit detecting a speed of the vehicle and tire air pressure of front wheel tires and rear wheel tires of the vehicle through air pressure sensors of the TPMS, wherein the TPMS determines whether the detected tire air pressure of the front wheel tires and the rear wheel tires are within a predetermined air pressure range;
   a speed measuring unit, the speed measuring unit measuring a wheel speed of the front wheel and a wheel speed of the rear wheel of the vehicle through wheel speed sensors of the TPMS if each of the detected tire air pressure of the front wheel tires and the rear wheel tires are within the predetermined air pressure range;
   a data storing unit, the data storing unit storing the predetermined air pressure range, a wheel speed difference map for the wheel speed of the front wheel and the wheel speed of the rear wheel, and a mass map for the speed of the vehicle, wherein the wheel speed difference map is designed for multiple tire characteristics for different types of vehicles, and wherein the mass map is designed for different speeds of a vehicle for the different types of vehicles;
   an error calculating unit, the error calculating unit acquiring a wheel speed difference of the front wheel and the rear wheel measured in the speed measuring unit through the wheel speed sensors of the TPMS and measuring an error by comparing the wheel speed difference of the front wheel and the rear wheel of the vehicle with the wheel speed difference map; and
   a mass calculating unit, the mass calculating unit estimating a vehicle mass of the vehicle corresponding to the error by using the mass map pre-stored in the data storing unit based on the speed of the vehicle to provide the estimated vehicle mass to the TPMS, wherein the TPMS evaluates the vehicle mass from the mass calculating unit based on the speed of the vehicle, the wheel speed of the front wheel and the rear wheel, the tire air pressures of the front wheel tires and the rear wheel tires, the wheel speed difference map, and the mass map.

2. The apparatus of claim 1, wherein the air pressure determining unit determines that the detected tire air pressure of the front wheel tires and the rear wheel tires are within the predetermined air pressure range when the detected air pressure belongs to the predetermined air pressure range and a difference between a maximum and a minimum of the detected air pressure is within the predetermined air pressure.

3. The apparatus of claim 1, wherein the error calculating unit calculates average speeds of the front wheels and the rear wheels, respectively, and calculates a difference between the calculated average speeds of the front wheels and the rear wheels.

4. The apparatus of claim 1, wherein the error calculating unit calculates the wheel speed difference between the front wheel and the rear wheel of the vehicle corresponding to the detected vehicle speed by using the wheel speed difference map for each vehicle tire pre-stored in the data storing unit and calculates an error by comparing the calculated wheel speed difference of the front wheel and the rear wheel with the wheel speed difference between the front wheel and the rear wheel of the vehicle calculated by using the wheel speed difference map for each vehicle tire.

5. The apparatus of claim 1, wherein the data storing unit stores the wheel speed difference map for each speed of the vehicle in which the speed of the vehicle according to a vehicle tire characteristic and the wheel speed difference between the front wheel and the rear wheel of the vehicle are mapped.

6. The apparatus of claim 1, wherein the data storing unit stores the mass map for each speed of the vehicle in which the error between the wheel speed differences according to the speed of the vehicle and the vehicle mass are mapped.

7. The apparatus of claim 1, wherein the multiple tire characteristics for different types of vehicles includes a tire type, a tire size, a tire mass, a tire use, and tire manufacturing information.

8. A method for estimating vehicle mass in a tire pressure monitoring system (TPMS) of a vehicle, the method comprising:
   detecting a speed of the vehicle and tire air pressure of front wheel tires and rear wheel tires of the vehicle through air pressure sensors of the TPMS;
   determining whether the detected tire air pressure of the front wheel tires and the rear wheel tires are within a predetermined air pressure range;
   measuring a wheel speed of the front wheel and a wheel speed of the rear wheel of the vehicle through wheel speed sensors of the TPMS if each of the detected tire air pressure of the front wheel tires and the rear wheel tires are within the predetermined air pressure range;
   acquiring the measured wheel speed difference between the front wheel and the rear wheel;
   measuring an error by comparing the wheel speed difference of the front wheel and the rear wheel of the vehicle with a pre-stored wheel speed difference map for the wheel speed of the front wheel and the wheel speed of the rear wheel, wherein the wheel speed difference map is designed for multiple tire characteristics for different types of vehicles; and
   estimating a vehicle mass of the vehicle corresponding to the error by using a pre-stored mass map based on the speed of the vehicle to provide the estimated vehicle mass to the TPMS, wherein the mass map is designed for different speeds of a vehicle for the different types of vehicles,
   and wherein the TPMS evaluates the vehicle mass based on the speed of the vehicle, the wheel speed of the front wheel and the rear wheel, the tire air pressures of the front wheel tires and the rear wheel tires, the wheel speed difference map, and the mass map.

9. The method of claim 8, wherein in the determining of whether the detected tire air pressure of the front wheel tires and the rear wheel tires are within the predetermined normal air pressure range, the detected tire air pressure of the front wheel tires and the rear wheel tires are determined to be included in the predetermined air pressure range when the detected air pressure belongs to the predetermined air pressure range and a difference between a maximum and a minimum of the detected air pressure is within the predetermined air pressure.

10. The method of claim 8, wherein in the calculating of the wheel speed difference, average speeds of the front wheels and the rear wheels are calculated, respectively, and a difference between the calculated average speeds of the front wheels and the rear wheels is calculated.

11. The method of claim 8, wherein the calculating of the error includes:

calculating the wheel speed difference between the front wheel and the rear wheel of the vehicle corresponding to the detected vehicle speed by using the pre-stored wheel speed difference map for each vehicle tire; and calculating an error by comparing the calculated wheel speed difference of the front wheel and the rear wheel with the wheel speed difference between the front wheel and the rear wheel of the vehicle calculated by using the wheel speed difference map for each vehicle tire.

12. The method of claim 8, wherein in the pre-stored wheel speed difference map for each speed of the vehicle, the speed of the vehicle according to a vehicle tire characteristic and the wheel speed difference between the front wheel and the rear wheel of the vehicle are mapped.

13. The method of claim 8, wherein in the pre-stored mass map for each speed of the vehicle, the error between the wheel speed differences according to the speed of the vehicle and the vehicle mass of the vehicle are mapped.

* * * * *